Oct. 30, 1951     CARL-ERIK GRANQVIST     2,573,435

NAVIGATION INSTRUMENT

Filed Jan. 29, 1945     2 SHEETS—SHEET 1

INVENTOR.
Carl-Erik Grandqvist

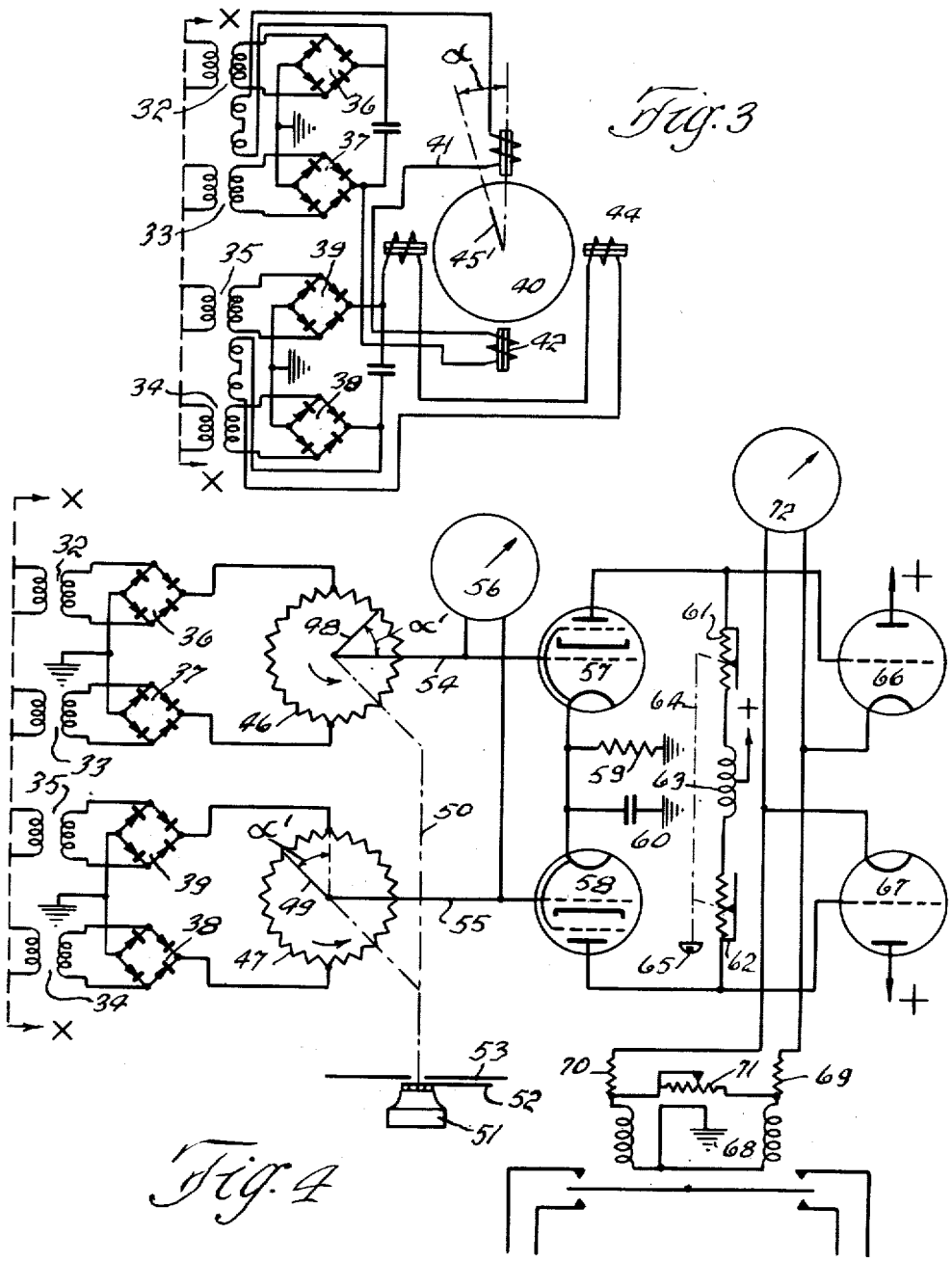

Patented Oct. 30, 1951

2,573,435

UNITED STATES PATENT OFFICE 2,573,435

NAVIGATION INSTRUMENT

Carl-Erik Granqvist, Lidingo, Sweden, assignor to Svenska Aktiebolaget Gasaccumulator, Lidingo (near Stockholm), Sweden, a corporation of Sweden Application January 29, 1945, Serial No. 575,174
In Sweden January 21, 1944

Section 1, Public Law 690, August 8, 1946
Patent expires January 21, 1964

8 Claims. (Cl. 33—204)

This invention relates to navigation instruments of the earth inductor type in which an indication of the orientation with respect to the magnetic meridian is obtained from a generator operating in the earth's magnetic field. Although such instruments may be used as compasses they are also useful for other purposes, such as for automatic steering. They are referred to herein, for convenience, as compasses. It is to be understood, however, that the invention is not to be restricted to instruments which operate as compasses.

In instruments of this type four magnet cores have been arranged at an angle of 90° to each other, so that they act on a common two-pole rotor, voltages being induced in windings on the four cores. The windings on opposite cores are connected in series and the resulting voltages are compared to determine the difference in magnitude of the respective rectified voltages. A voltage measuring instrument connected to respond to the voltage difference thus obtained is adapted to indicate the geographical direction of orientation of the craft. In such induction compasses, however, the same indication is obtained on the voltage indicating instrument for at least two different directions which are images of each other. In order to obviate this it has been proposed to polarize the magnetic cores of each pair. In this way different voltages are obtained dependent on whether the polarization aids or opposes the earth magnetic field, so that it is possible to determine the absolute direction.

The above procedure has the disadvantage, however, that even though the voltages representing opposite directions are somewhat different, depending on whether the compass is oriented so that the polarizing field aids or opposes the earth's magnetic field, it is difficult to determine the absolute direction even by the use of a separate voltage measuring instrument.

An instrument of the above type does not indicate accurately over more than a small angle and therefore it must be manually or automatically adjusted so that it will always produce a zero indication. The orientation of the craft may thus be determined from the angle by which the instrument was corrected. It is obvious that this correction introduces a complication and that it would be advantageous to provide an instrument which indicates the correct heading of the craft without correction.

The use of discriminators for indicating the north-south direction introduces a further disadvantage since the elements are comparatively expensive and complicated and require careful adjustment which must be repeated from time to time.

The present invention relates to an improvement in induction compasses of the above type in which said disadvantages are eliminated and in which the reading may be made more certain. According to this invention the stator windings of the induction compass are not, as heretofore, connected to discriminators for measuring the voltage difference, but are connected to an indicator which is adapted to indicate the angular displacement between the induced voltages which represents the angular deflection of the cores which carry the induced windings with respect to the earth's field. Rotation of the rotor will induce an alternating voltage in the stator windings. If the craft turns relative to the horizontal component of the earth's field, however, the value of the alternating voltages is likewise changed, so that the voltage increases in one pair of opposite windings and decreases in the other pair of opposite windings. If the craft should move in a circular path the voltage induced by rotation of the rotor would form the carrier wave of a signal which would be modulated by a frequency determined by the turning of the craft. It is the phase position of the modulation frequency which is measured in the present system. In accordance with one embodiment of the invention, coordinated magnet cores are further polarized in opposite directions so that any possibility of uncertainty in the reading is obviated.

The invention is described below in connection with the accompanying drawings, in which:

Fig. 3 is a partial diagrammatic representation of a still further embodiment of the invention; and Fig. 4 is a diagrammatic representation similar to Fig. 3 but showing the use of the instrument as a heading indicator and course steering device.

Figure 1:
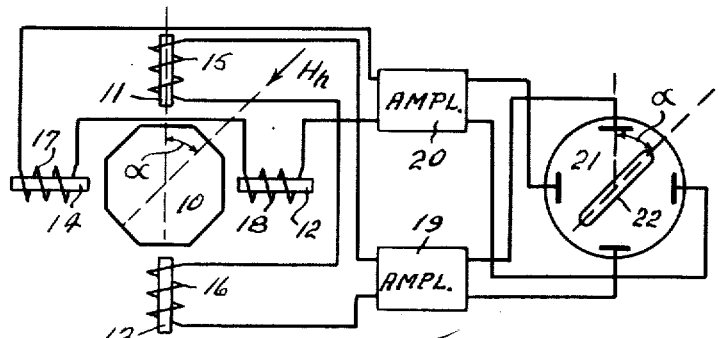
Fig. 1 is a diagrammatic representation of a simple embodiment of the invention.

In Fig. 1 a rotor 10, which may be of the type shown in U. S. Patent No. 2,038,787 to Guerra dated April 28, 1936, is shown as rotating between ferromagnetic cores 11, 12, 13 and 14. The cores 11 and 13 are provided with windings 15 and 16, respectively, which are connected in series. In a similar way the cores 12 and 14 are provided with windings 17 and 18 connected in series. The terminals of the windings 15 and 16 are connected to the input terminals of a first amplifier 19 and the terminals of the windings 17 and 18 are connected to the input terminals of a second amplifier 20. The output terminals of the amplifier 19 are connected to two opposite deflection electrodes of an indicator 21 and the output terminals of the amplifier 20 are connected to the other two deflection electrodes of the indicator 21.

The indicator 21 may be of any known type for indicating the angular displacement between two supplied voltages. For example, a phase angle meter, a synchronous repeater, a cathode ray oscilloscope or the like. In Fig. 1 it is assumed that the indicator comprises a cathode ray oscilloscope with deflection electrodes which are arranged to influence the cathode ray by an electric field.

In order to explain the above system, it is assumed that the earth magnetic field extends in such a direction that its horizontal component lies in the direction of the arrow and that the horizontal component forms an angle $a$ with the longitudinal direction of the cores 11 and 13 and has a field intensity of $H_h$. In the windings 15 and 16 of the cores 11 and 13 a voltage $V_1$ is obtained which may be represented as follows:

$$V_1 = K. \cos a. \sin \omega t$$

In the windings 17 and 18 the following voltage is obtained:

$$V_2 = K. \sin a. \sin \omega t$$

In the above equation K represents a constant and $\omega$ the angular frequency of the induced alternating voltage. In order that the created voltages of the angular frequency $\omega$ should be synchronous, it is required that the rotor be a four-pole one. With a four-pole rotor a mechanical angular speed of $\omega/4$ rad./sec. is required.

It is of essential importance that the cores 11, 12, 13 and 14 be situated in a horizontal plane, for which purpose the compass may be under the control of a gyroscope, that is, the rotor part of a gyroscope may be arranged on the same shaft as the rotor part 10 of the induction generator.

If the two voltages from the amplifiers 19 and 20 are connected to the deflection electrodes of the cathode ray oscilloscope 21, an inclined line 22 would be obtained on the screen which would be formed by the ray oscillating at a frequency corresponding to the angular speed $\omega$ and having an inclination with respect to the control direction of the deflection electrodes represented by the angle $a$.

Figure 2:
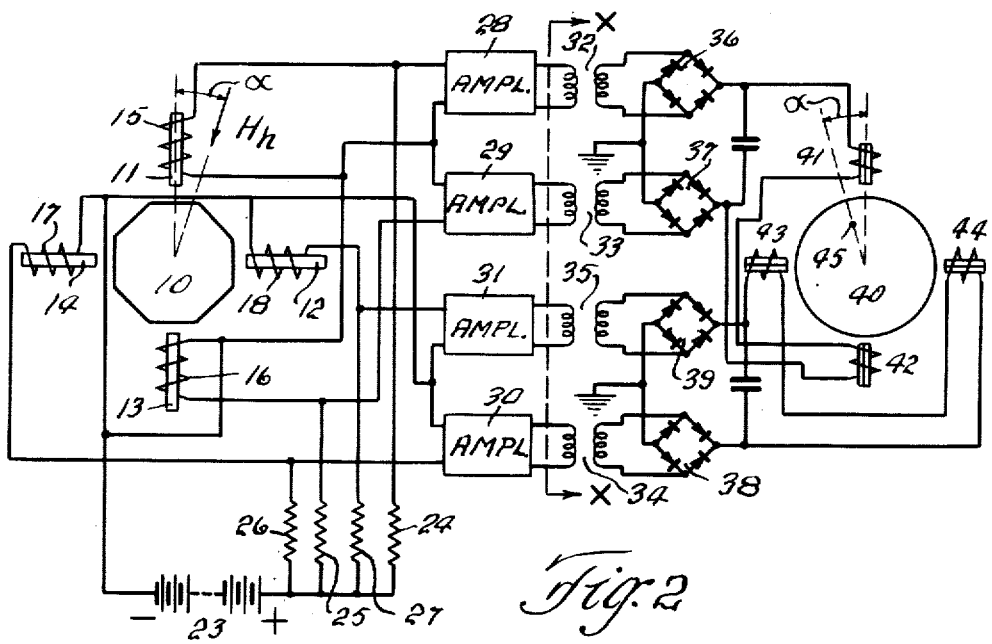
Fig. 2 is a diagrammatic representation illustrating a further embodiment of the invention.

In the above system the indication is not entirely unambiguous inasmuch as the line does not differentiate between the opposite directions. In accordance with a further embodiment of the invention, a polarization is introduced in such manner that the cores containing the above windings are polarized in opposite directions. The polarizing field may be formed by permanent magnets or by direct current excitation. In the arrangement of Fig. 2 the direct current excitation is used in such a way that the same winding is used for the excitation and for the induced alternating voltage.

In Fig. 2 the rotor 10 and the cores 11 to 14 are arranged as in Fig. 1. Windings 15 to 18 are disposed on the cores 11 to 14 in the same manner. In Fig. 2 the windings, however, are connected to a source of direct current 23, one terminal of which is connected to the common point of the windings 15 and 16 and of the windings 17 and 18, the other terminals of said windings being connected across protecting resistors 24 to 27, respectively, to the opposite terminal of the source 23. The windings 15 to 18 are connected respectively with the input terminals of individual amplifiers 28 to 31. The output terminals of said amplifiers are connected respectively through transformers 32 to 35 to rectifiers 36 to 39. The rectifiers preferably are of the double wave type which are shown as connected in a Graetz bridge.

Rectifiers 36 and 37, which are supplied by the windings 15 and 16, are connected in series to one pair of deflection elements 41 and 42 of the cathode ray oscilloscope 40, rectifiers 38 and 39 associated with windings 17 and 18 being connected in series with the other pair of deflection elements 43 and 44. In order to avoid instability, each of the rectifier circuits may be connected to ground for example at the common connections in the output sides of the pairs of rectifiers.

In Fig. 2 the deflection elements have been shown in the form of inductively coupled magnets.

By polarization there is obtained in the four cores fields of the same intensity $H_p$. If it is assumed as above, that the horizontal component of the earth magnetic field lies in the direction $a$ with the field intensity $H_h$, a field intensity of $H_p+H_h \cos a$, will be obtained through the core 11, a field intensity of $-H_p+H_h \cos a$ through the core 13, a field intensity of $H_p+H_h \sin a$ through the core 12 and a field intensity of $-H_p-H_h \sin a$ through the core 14. Regarding first the windings 15 and 16, in these windings the following voltages will be obtained $$V_{15} = K_1(H_p+H_h \cos a) \sin \omega t$$

and $$V_{16} = K_1(-H_p+H_h \cos a) \sin \omega t$$

$K_1$ is a constant.

The non-pulsating component of the potential difference between the outputs of the rectifiers 36 and 37 and fed to the deflection means 41 and 42 will be $$V_{36-37} = K_2 H_h \cos a$$

In a similar way there is obtained from the rectifiers 38 and 39 a voltage $$V_{38-39} = K_2 H_h \sin a$$

$K_2$ is here a constant for variation of $a$

These voltages when applied to the deflection elements cause the luminescent spot 45 which is formed on the screen of the cathode ray oscilloscope 40 to be deflected from the center of the screen in a direction which is determined by the angle $a$. This may be read on a suitable scale which may be provided on the screen. However, it is obvious from the above that the distance of the spot 45 from the center of the screen will be dependent among other things upon the magnitude of the horizontal component of the earth's field. As this varies from place to place, the spot will be formed at varied distances from the scale. This may make the reading more difficult and it is therefore desirable to convert the spot to a radial line which is similar in position to the pointer of an instrument.

Fig. 3 illustrates an embodiment in which this is obtained. The circuit of Fig. 3 replaces the part of the circuit of Fig. 2 to the right of the line $x$—$x$.

The arrangement of Fig. 3 differs from the arrangement of Fig. 2 only in that the transformers 32 to 35 are provided with an additional winding and these additional windings are connected in series with the output circuits of the rectifiers. The two additional windings of the transformers 32 and 33 are shown as connected in series in the circuit leading to the deflection elements 41 and 42. In a corresponding way the additional windings of the transformers 34 and 35 are connected in series in the circuit leading to the deflection elements 43 and 44.

The voltages induced in the additional windings are not rectified, and therefore they will have the form $$V_{e1} = K_3 H_h \sin a \cdot \sin \omega t$$
$$V_{e2} = K_3 H_h \sin a \cdot \sin \omega t$$

$K_3$ is here a constant.

As a result the spot of Fig. 3 is caused to oscillate about the point 45 of Fig. 2 and in a direction determined by the angle $a$ so as to form a radial line the length of which depends upon the magnitude of the voltage introduced by the additional windings. This line is indicated in Fig. 3 as the line 45'. It is evident that this line corresponds largely to a pointer moving over a scale and the reading of the indication is thus facilitated.

It should be noted that in such case when the voltage supplied to the indicator contains not only the rectified component but also applied alternating voltages it is important that the alternating voltages be in phase. It is evident from the arrangement of Fig. 1 that when the craft turns in such a way that the angle $a$ varies in magnitude the induced voltages may be regarded as two modulated alternating voltages the carrier wave frequency of which is $\omega$, and which are modulated in accordance with variations of the factor $\sin a$ and $\cos a$, respectively. Although the systems shown in Figs. 1 and 3 are intended to measure the angle $a$, the two alternating voltages of frequency $\omega$ which are introduced, that is the two oscillations of carrier wave frequency, must be in phase in order to produce a straight line on the cathode ray oscilloscope instead of an ellipse or circle. For this purpose it is necessary that the rotor of the induction generator have a number of poles corresponding to the number of magnetic cores or a multiple thereof. In previous systems it was not possible to measure the angle as specified above due to the fact that the induction generators utilized four cores with only two armature poles.

The system has been described above as applied to a compass. The system may also take the form of a combined heading indicator and automatic pilot. The heading indicator is adapted to show the orientation and the automatic pilot is adapted to actuate steering mechanism with an indicator to show heading deviation. Such an arrangement is shown in Fig. 4, which shows only the portion of a system to the right of the line $x$—$x$ of Fig. 2.

In Fig. 4 the transformers 32 to 35 and rectifiers 36 to 39 are arranged in a manner similar to Fig. 2. The output terminals of the rectifiers 36 and 37, however, are connected to diametrically opposite points of a circular rheostat 46. Similarly, the output terminals of rectifiers 38 and 39 are connected to diametrically opposite points of circular rheostat 47. The contact arms 48 and 49, respectively, of rheostats 46 and 47 are adapted to be moved by a common controller indicated as a shaft 50 which is movable by means of a handle 51 having a pointer 52 which is movable over a scale 53. In zero position the arms 48 and 49 are mutually displaced in position by 90°. In the figure they are shown as turned at an angle $a'$ from their initial positions.

The contact arms 48 and 49 are connected respectively to conductors 54 and 55. These conductors are connected to a voltmeter 56 which is adapted to indicate the heading deviation and are also connected to control grids of amplifiers 57 and 58 respectively, the cathodes of which are connected together and are provided with a common cathode bias resistor 59. The resistor 59 is bypassed for alternating currents by a condenser 60. The common cathode bias resistor is adapted to cause both the amplifier tubes 57 and 58 to operate with the same amplification.

The tubes 57 and 58 are shown as pentodes. Their anode circuits are connected over symmetrical circuits containing resistors 61 and 62 and an inductance 63 having a mid-point tap. Either the inductance 63 or the resistors 61 and 62 are pre-adjusted in accordance with the characteristics of the craft. As shown, the resistors are made variable and adjustable by a common means indicated by the line 64 and controlled by an adjusting screw 65. This adjustment when once made is intended to remain fixed.

The output voltages from the tubes 57 and 58 are fed to control grids of direct current amplifier tubes 66 and 67, respectively, in the output circuits of which a balanced relay 68 is connected. The relay 68 is shown as connected in the cathode leads with its windings connected in series with cathode bias resistors 69 and 70 from the tubes 66 and 67. For control purposes the relay may be shunted by an adjustable resistor 71. Although the relay 68 is shown as of the balanced type, it may be desirable for continuously or intermittently varying action that the output current from the relay be proportionate to the current flowing through the winding. A second control instrument 72 such as a voltmeter may be connected across the relay 68. This instrument is adapted to give an indication which is dependent not only upon the heading deviation but also upon the yawing, that is, the speed at which the heading deviation is increased or decreased.

With the vessel on a constant correct heading both of the instruments 56 and 72 should remain with their pointers at zero. The amplifier including the tubes 57, 58, 66 and 67 has been shown in the form of a symmetrical amplifier, although it may comprise only one pair of tubes. A symmetrical amplifier is preferred because with a single amplifier there is a possibility that excessive direct magnetizing current may flow through the inductance 63. In the symmetrical arangement the excitation current is decreased to a minimum value which is determined by the leakage inductance of the coil.

The operation of the above system will be apparent from the following:

It has been shown above that the voltage between the output terminals of the rectifiers 36 and 37 and between the output terminals of the rectifiers 38 and 39 is as follows:

$$V_{36-37} = K_2 H_h \cos a$$

and $$V_{38-39} = K_2 H_h \sin a$$

respectively;

These voltages are the one created by the earth's magnetic field. There is added to them the rectified voltage from the polarizing field, which is, however, no function of the angle $a$.

Disregarding for the present this constant voltage, the above mentioned voltages are now impressed on the potentiometers 46 and 47, respectively. Depending upon their setting, therefore, voltages are obtained between the conductors 54 and 55, respectively, and ground, equal to $$V_{54} = C_1 \cos a$$

and $$V_{55} = C_2 \sin a$$

respectively;

In the above equations $C_1$ and $C_2$ indicate two factors, which contains the constants $K_2$, the field intensity of the horizontal component of the earth's magnetic field and the transfer constant of the potentiometers. Attention is called to the fact that the last named value is variable with the angle $a'$, but the potentiometers are so made that the variation takes place according to a law as far as possible trigonometrically determined according to the following:

$$C_1 = kH_h \sin a'$$

and $$C_2 = kH_h \cos a'$$

respectively;

$k$ indicates here a constant.

The angle $a'$ represents the heading angle which the craft is set automatically to maintain, whereas for one reason or another an angular error $\Delta$ has developed, so that the craft has instead taken the heading $a = a' - \Delta$. It is the error $\Delta$, which is indicated on the instrument 56 and is to be corrected by means of the automatic pilot arrangement. From the above it will be evident that the difference in potential between the conductors 54 and 55 will be $$V_{54-55} = kH_h \sin a' \cdot \cos a - kH_h \cos a' \cdot \sin a$$
$$V_{54-55} = kH_h [\cos a \cdot \sin(a+\Delta) - \sin a \cdot \cos(a+\Delta)]$$
$$V_{54-55} = kH_h \sin \Delta$$

To this voltage no constant voltage will be added, due to the polarizing field, although this voltage is present in the conductor 54 as well as in conductor 55 and will influence instrument 72. This depends upon the instrument 56 being connected between conductors 54 and 55 in such a way that it only shows the difference in voltage between these two conductors. On the other hand, this is of no importance because instrument 56 should only give a measure of an occasional error of setting which must, due to its nature, be rather small.

It is evident that the voltmeter connected between the conductors 54 and 55 will directly indicate the heading error, measured in relation to the heading set on the scale 53. A voltage depending upon the error of heading, however, is also fed to the control grids of the tubes 57 and 58 where it is amplified. It is known that for avoiding oscillations it is desirable that the piloting be dependent not only upon the present deviation of heading but also upon the speed with which the heading deviation is increasing or decreasing, that is dependent upon the derivative of the heading deviation. It is for this purpose that a resistor 61 and 62, respectively, as well as an induction coil 63 have been introduced in the anode conductors of the tubes 57 and 58. The voltage present between the control grids of the tubes 66 and 67 should in other words be $$V_{66-67} = K_4 \cdot \Delta + K_5 \cdot \frac{d\Delta}{dt}$$

As a rule it may be assumed that the angle $\Delta$ is very small. Consequently one may with allowable approximation write $\Delta = \sin \Delta$ and $\cos \Delta = 1$, respectively. The equation given next above then will be transferred into the form:

$$V_{66-67} = K_4 \cdot \sin \Delta + K_5 \cos \Delta \cdot \frac{d\Delta}{dt}$$

Indicating now the mutual conductance of the tubes 57 and 58 with S, the resistance in the resistor elements 61 and 62 with R and the inductance of the coil 63 with L, a voltage is obtained between the control grids in the tubes 66 and 67 of $$V_{66-67} = kH_h \left( S \cdot R \cdot \sin \Delta + S \cdot L \cdot \cos \Delta \cdot \frac{d\Delta}{dt} \right)$$

said voltage being the result of amplification of the voltage $V_{54-55}$ in the tubes 57 and 58, especially regarding the complex nature of the load resistor. This means that the above given constants $K_4$ and $K_5$, respectively, have the values $$K_4 = kH_h SR$$

and $$K_5 = kH_h SL$$

respectively;

For deciding the approximate magnitude of the resistor R and the inductance L, respectively, the following example may be given: In a certain case it is assumed that for the sake of stability it is required to obtain an equally great control voltage for a deviation of 1° as for a speed of deviation of 1°/sec. The resistance R may be assumed to be 10,000 ohms although it varies according to the internal resistance of the tubes used. Therefrom according to the above the inductance L was calculated to be 165 h. As evident herefrom the inductance in the coil 63 should assume relatively large values in order that the desired action should be obtained. The inductance is excited symmetrically so that no appreciable direct current excitation shall arise therefrom.

The voltage fed to the tubes 66 and 67 is amplified in these tubes and is fed partly to the relay arrangement 68 in order to control the machinery for automatic piloting, partly also to an instrument 72 preferably of the same kind as the instrument 56. The instrument 72 has for its purpose to show the setting of the automatic pilot means, but the instrument will show a deflection which is composed of the heading deviation plus a term dependent upon the speed of said deviation or yawing. The yawing thus may be read per se either by arranging a third instrument which shows the difference between the readings of the instruments 56 and 72, or by reading both of these instruments and calculating the difference their readings.

The invention is not to be limited to the specific embodiments disclosed above but may vary in the details of the various parts. For example, the induction generator may take the form of a four-pole generator comparable to an electrical two-phase or four-phase generator. However, any equal number of cores higher than four may be used.

What is claimed is:

1. An earth induction device of the class described comprising a plurality of radially disposed inductors having windings arranged in diametrically opposite pairs with the pairs angularly displaced, a magnetic rotor having poles at least equal in number to said inductors and cooperating with said inductors to generate alternating currents therein, an indicator having elements connected to the windings on said pairs of inductors to respond to the instantaneous voltages induced therein due to the combined effect of said rotor and of the earth's magnetic field, and means responsive to the voltages supplied to said elements to indicate an angular displacement corresponding to the orientation of said inductors with respect to the earth's field, a source of polarizing potential, said windings having a common connection to one terminal of said source and resistors connected in series with each winding and connected to the other terminal of said source, whereby the inductors of each pair are oppositely polarized.

2. An earth induction device as set forth in claim 1 in which said indicator comprises a cathode ray oscilloscope having deflection electrodes connected to the respective windings.

3. An earth induction device of the class described comprising a plurality of radially disposed inductors having windings arranged in diametrically opposite pairs, with the pairs angularly displaced, a magnetic rotor having poles at least equal in number to said inductors and cooperating with said inductors to generate alternating currents therein, an indicator having elements connected to the windings on said pairs of inductors to respond to the instantaneous voltages induced therein due to the combined effect of said rotor and of the earth's magnetic field, the inductors of each pair being polarized in directions opposing each other, and the windings applied on said inductors being connected in series so that the components of voltages due to the earth's magnetic field are added, and means responsive to the voltages supplied to said elements to indicate an angular displacement corresponding to the orientation of said inductors with respect to the earth's field, said device including amplifiers connected to the respective windings, rectifiers connected to the respective amplifiers to rectify the voltages produced thereby, means connecting the rectified voltages to said indicator elements, and means superimposing on said elements non-rectified voltages from said amplifiers.

4. An earth induction device of the class described comprising a plurality of radially disposed inductors having windings arranged in diametrically opposite pairs, with the pairs angularly displaced, a magnetic rotor having poles at least equal in number to said inductors and cooperating with said inductors to generate alternating currents therein, means rectifying the voltages induced in said windings, a plurality of circular potentiometers having rotatable arms, means supplying said rectified voltages from the windings of each pair to diametrically opposite points of the respective potentiometers, said arms being connected for control in unison and being mutually displaced by an angle corresponding to the angular displacement of said inductors whereby said rotatable arms develop a potential difference which is a function of the angular displacement of the inductors in the earth's field.

5. An earth induction device of the class described comprising a plurality of radially disposed inductors having windings arranged in diametrically opposite pairs, with the pairs angularly displaced, a magnetic rotor having poles at least equal in number to said inductors and cooperating with said inductors to generate alternating currents therein, means rectifying the voltages induced in said windings, a plurality of circular potentiometers having rotatable arms, means supplying said rectified voltages from the windings of each pair to diametrically opposite points of the respective potentiometers, said arms being connected for control in unison and being mutually displaced by an angle corresponding to the angular displacement of said inductors, and a voltage responsive instrument connected across said arms and arranged to indicate the deviation of the setting of said arms from a predetermined setting.

6. An earth induction device of the class described comprising a plurality of radially disposed inductors having windings arranged in diametrically opposite pairs, with the pairs angularly displaced, a magnetic rotor having poles at least equal in number to said inductors and cooperating with said inductors to generate alternating currents therein, means rectifying the voltages induced in said windings, a plurality of circular potentiometers having rotatable arms, means supplying said rectified voltages from the windings of each pair to diametrically opposite points of the respective potentiometers, said arms being connected for control in unison and being mutually displaced by an angle corresponding to the angular displacement of said inductors, amplifiers connected to be controlled by the voltages of said arms, a differential relay connected to be actuated in accordance with the differential effect of said amplifiers, and circuit means controlled by said relay.

7. An earth induction device of the class described comprising a plurality of radially disposed inductors having windings arranged in diametrically opposite pairs, with the pairs angularly displaced, a magnetic rotor having poles at least equal in number to said inductors and cooperating with said inductors to generate alternating currents therein, means rectifying the voltages induced in said windings, a plurality of circular potentiometers having rotatable arms, means supplying said rectified voltages from the windings of each pair to diametrically opposite points of the respective potentiometers, said arms being connected for control in unison and being mutually displaced by an angle corresponding to the angular displacement of said inductors, amplifiers connected to be controlled by the voltages of said arms, a circuit including inductance and resistance elements connected between the output circuits of said amplifiers and arranged to develop voltages which are a function both of the deviation of said inductors and of the rate of change of deviation, and circuit means responsive to said last voltages.

8. An earth induction device of the class described comprising a plurality of radially disposed inductors having windings arranged in diametrically opposite pairs, with the pairs angularly displaced, a magnetic rotor having poles at least equal in number to said inductors and cooperating with said inductors to generate alternating currents therein, means rectifying the voltages induced in said windings, a plurality of circular potentiometers having rotatable arms, means supplying said rectified voltages from the windings of each pair to diametrically opposite points of the respective potentiometers, said arms being connected for control in unison and being mutually displaced by an angle corresponding to the angular displacement of said inductors, amplifiers connected to be controlled by the voltages of said arms, a circuit including inductance and resistance elements connected between the output circuits of said amplifiers and arranged to develop voltages which are a function both of the deviation of said inductors and of the rate of change of deviation, and a differential relay connected to be actuated in accordance with the differential effect of said last voltages, and circuit means controlled by said relay.

CARL-ERIK GRANQVIST.

REFERENCES CITED

The following references are of record in the file of this patent:

UNITED STATES PATENTS

| Number | Name | Date |
|---|---|---|
| 1,968,542 | Tear | July 31, 1934 |
| 2,025,897 | Reichel | Dec. 31, 1935 |
| 2,038,787 | Guerra | Apr. 28, 1936 |
| 2,261,309 | Stuart, Jr. | Nov. 4, 1941 |
| 2,373,096 | Bonell | Apr. 10, 1945 |

FOREIGN PATENTS

| Number | Country | Date |
|---|---|---|
| 587,817 | Great Britain | May 6, 1947 |

Certificate of Correction

Patent No. 2,573,435                                          October 30, 1951

CARL-ERIK GRANQVIST

It is hereby certified that error appears in the printed specification of the above numbered patent requiring correction as follows:

Column 5, line 13, for sin, first occurrence, read cos; column 8, line 59, before "their" insert *between*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*